Feb. 14, 1939.  D. HAMLIN  2,147,251
SAW SET
Filed Aug. 7, 1937
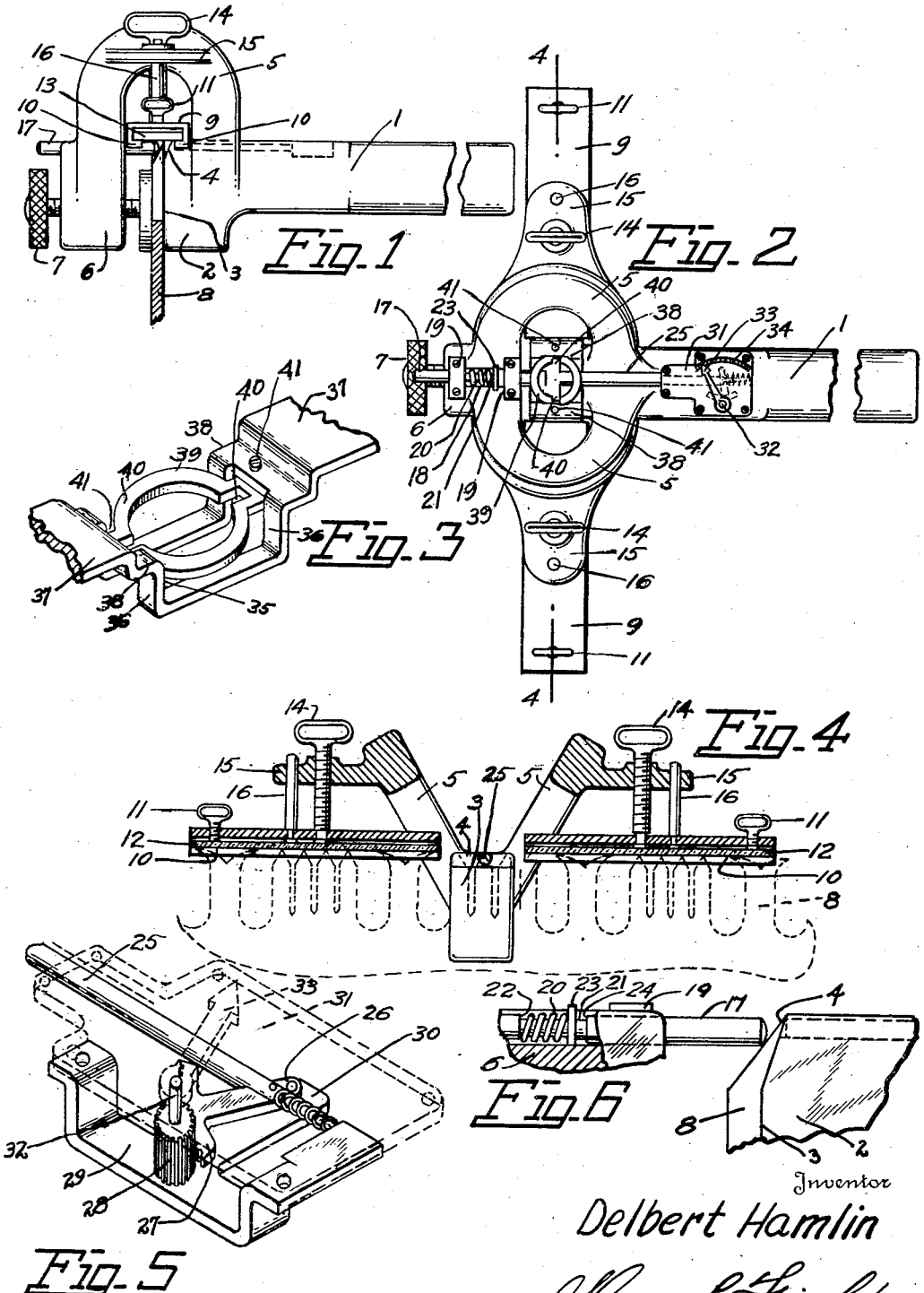
Inventor
Delbert Hamlin Patented Feb. 14, 1939

2,147,251

UNITED STATES PATENT OFFICE 2,147,251

SAW SET

Delbert Hamlin, Baker City, Oreg.

Application August 7, 1937, Serial No. 157,909

3 Claims. (Cl. 76—70)

This invention relates to an improved saw set which may be used for setting teeth of a cross cut saw provided with raker teeth or having these teeth omitted, and one object of the invention is to provide a tool of this class which will serve not only as a saw set but also as a jointer and as a raker gage.

When a saw is in use its efficiency depends upon the condition of its teeth; their set and sharpness, and in the case of a cross cut saw, the condition of their raker teeth. The cost of having a saw sharpened by an expert filer often leads amateurs and unskilled workmen to sharpen their own saws, thus entailing a great deal of tedious labor and often resulting in an improper setting or jointing of the teeth.

Therefore, one object of this invention is to provide a tool which is so constructed that when used, the teeth of a saw will have the proper set and also properly jointed. In other words, the teeth will all be set at the same angle and their free ends will be at the proper level.

Another object of the invention is to provide a saw set of such construction that it may be firmly clamped to a saw blade and held in the proper position while the teeth are being set.

The invention is illustrated in the accompanying drawing, wherein

Figure 1 is a view showing the improved tool in side elevation and applied to a saw blade shown in transverse section.

Figure 2 is a top plan view of the tool.

Figure 3 is a fragmentary view in perspective of the raker gage.

Figure 4 is a sectional view taken along the line 4—4 of Figure 2.

Figure 5 is a perspective view illustrating details of the setting gage.

Figure 6 is a fragmentary view of the plunger forming part of the setting mechanism and illustrating the manner of mounting the same.

This improved tool has a frame formed with a handle 1 by which it may be held when in use. At its front end, the handle has a head 2 which may be referred to as an anvil and has a flat front end face 3 above which is provided a rearwardly inclined face 4. Yokes 5 which are of an inverted U-shape as shown in Figure 1 rise from the head 2 at opposite sides thereof and are disposed in diverging relation to each other, as shown in Figure 4, so that when the tool is in use a clear view of the saw teeth and setting mechanism may be had when looking down upon the tool, as shown in Figure 2. The yokes or arms project forwardly from the head 2 and at their front ends are united to a block 6 having a threaded opening formed therein to receive the threaded stem of a clamp 7 having a swiveled disk to bear against a saw blade 8 and clamp the blade against the flat face 3 of the anvil 2 when the stem is turned in the proper direction.

In spaced relation to opposite sides of the space between the anvil and the block 6 are disposed holders 9 formed of metal strips having depending inwardly disposed flanges 10 in order that files and glass plates may be selectively applied to the holders and retained in engagement therewith when the set screws 11 carried by the holders are tightened. Glass plates 12 have been shown applied to the holders in Figure 4, while in Figure 1 files 13 are shown. The holders or carriers 9 extend transversely of the yokes 5 and are swiveled to the lower ends of hangers or threaded stems 14 which are threaded through openings formed in side arms or wings 15 projecting transversely from outer sides of the yokes. By grasping the turning heads formed at upper ends of the stems and turning the stems, the carriers may be vertically adjusted and since the carriers are provided with rods or pins 16 slidably engaged through openings in the wings, the carriers will be caused to move vertically without turning out of their proper positions in which they extend parallel to the wings and at right angles to the handle 1. It will thus be seen that the glass plates or files carried by the holders may be disposed even with each other and at a desired elevation relative to the inclined face 4 of the anvil. By this arrangement the files may be fitted into the carriers and secured by the set screws, the carriers being then adjusted by turning the stems 14 and the tool applied to a saw blade which has been mounted in a vice or saw holder of any desired construction. The clamp 7 is left loose and by grasping the handle the tool will be slid longitudinally of the saw blade. As the tool is slid along the saw blade, the files will act against the upper ends of the previously filed teeth to even them. After the teeth have been evened the tool is removed from the saw, the set screws loosened to permit removal of the files and the glass plates substituted so that when the tool is again applied to the saw blade, the teeth will not be damaged as the tool is progressively shifted along the saw and secured in position by tightening the clamp.

As the tool is moved along the saw and secured in place, the teeth are to be set and in order to do so there has been provided a setting plunger 17 which is slidably mounted in a groove 18 formed in the block 6 intermediate the width thereof. Cross plates 19 prevent the plunger from slipping out of the groove and in order to yieldably hold the plunger in an extended position there has been provided a spring 20 coiled about the reduced portion 21 of the plunger with one end bearing against the shoulder 22 at the outer end of the reduced portion and at its other end bearing against a web or plate 23 through which the reduced portion of the plunger is slidably engaged. The shoulder 24 limits outward movement of the plunger under influence of the spring. By striking the outer or front end of the plunger with a hammer or other driving implement, the plunger will be forced inwardly and as its inner or rear end engages a tooth, the tooth will be forced toward the inclined face of the anvil. The side face of the tooth opposite that engaged by the plunger bears against a rod 25 forming part of a gage and slidably mounted in a groove formed in the head or anvil 2, and upon referring to Figure 5 it will be seen that the rear end of the rod is pivoted to the shank 26 of an arcuate rack bar 27 meshing with a gear or pinion 28 rotatably carried by a bracket 29 in the side arm 30 of which the shank 26 is pivotally mounted. This bracket is mounted in a recess or pocket formed in the handle 1 rearwardly from the head 2 where it is secured by bolts which also serve to detachably secure a cover plate 31 in closing relation to the pocket. The stub axle 32 of the pinion 28 projects upwardly through an opening formed in the cover plate 31 and carries a pointer 33 which projects radially from the axle with its free end in operative relation to a scale 34 marked upon the upper face of the cover and it will be readily understood that when the rod 25 is forced rearwardly by pressure exerted by the tooth as the plunger 17 is struck with the hammer, the pointer will be swung rearwardly along the scale and accurately indicate the extent to which the tooth has been bent toward the inclined face of the anvil. Therefore, all of the teeth can be very easily set identically. It will thus be seen that an inexperienced person can properly set the saw teeth and also that a skilled workman can very quickly and very accurately perform the work.

If the saw is only provided with cutting teeth, the setting operation is completed, but if the saw has raker teeth, the glass plates will be removed from the carriers 9 and the raker-gage device shown in Figure 3 set in place. This device is formed from a strip of metal having its intermediate portion slotted as shown at 35 and bent upwardly in spaced relation to ends of the slot, as shown at 36, to form walls terminating at upper ends of the slots, the strip being then bent to form arms 37 which are received in the carriers 9 and have downwardly off set inner end portions 38. The gage 39 which is also formed of metal and is substantially circular in shape and has slotted arms 40 leading from its ends is disposed over the slot 35 of the supporting strip with its arms extending through the vertically extending end portions of the slot and engaged by screws 41. By adjusting these screws, the gage may be shifted vertically to the desired depth upon the raker teeth. The device when in place will be disposed between inner ends of the carriers, as shown in Figure 2, and by placing the tool over a saw blade with a raker tooth encircled by the circular gage, the tooth will project upwardly through the gage and its slotted arms and may be swaged to its proper shape and position.

Having thus described the invention, what is claimed as new is:

1. A tool of the character described comprising a handle, an anvil at the front end of said handle, a block, yokes supporting said block in front of said anvil, said handle having a pocket formed therein, and a groove leading forwardly from the pocket across the upper face of the anvil, a bracket in said pocket, a cover plate for the pocket, a scale being provided upon the outer face of the cover plate, a pinion rotatably carried by said bracket and having a shaft journaled through the cover plate, a pointer carried by the projecting upper end of said shaft with its free end in operative relation to the scale, a rack meshing with said pinion and having a shank pivoted to said bracket, an actuating rod slidable in said groove with its rear end portion extending into the pocket and pivoted to the shank of the rack bar, a spring yieldably holding the rod forwardly with its front end projecting from the front of said anvil to engage a tooth of a saw blade disposed between the anvil and block, and a setting element slidably carried by said block in alinement with the rod with its rear end disposed to engage a side of a tooth of a saw and bend the tooth transversely toward the anvil when the setting element is struck at its front end whereby the tooth will be set and the rod shifted rearwardly to move the rack and rotate the pinion to swing the pointer relative to the scale and register the set imparted to the tooth.

2. A tool of the character described comprising an anvil, a block, yokes rising from the anvil and block at opposite sides thereof and supporting the block spaced forwardly from the anvil, means for securing a saw blade between the block and anvil, arms projecting transversely from said yokes, carriers below said arms extending transversely of said anvil at opposite sides thereof, supporting stems for said carriers threaded vertically through said arms and having their lower ends swiveled to the carriers, rods rising from said carriers and slidably engaged through said arms to prevent turning of the carriers with the stems when the stems are rotated to vertically adjust the carriers, and saw tooth engaging elements detachably held by said carriers.

3. A tool of the character described comprising an anvil, a block, yokes rising from the anvil and block at opposite sides thereof and supporting the block spaced forwardly from the anvil, means for securing a saw blade between the block and anvil, arms projecting transversely from said yokes, carriers below said arms extending transversely of said anvil at opposite sides thereof, each carrier being formed from a strip of metal having depending flanges along its sides and being open at its inner and outer ends, saw tooth engaging members slid into the carriers, set screws carried by said carriers for engaging the tooth engaging members and binding the same against the flanges, and means for suspending the carriers beneath the arms and vertically adjusting the carriers.

DELBERT HAMLIN.